2,766,791

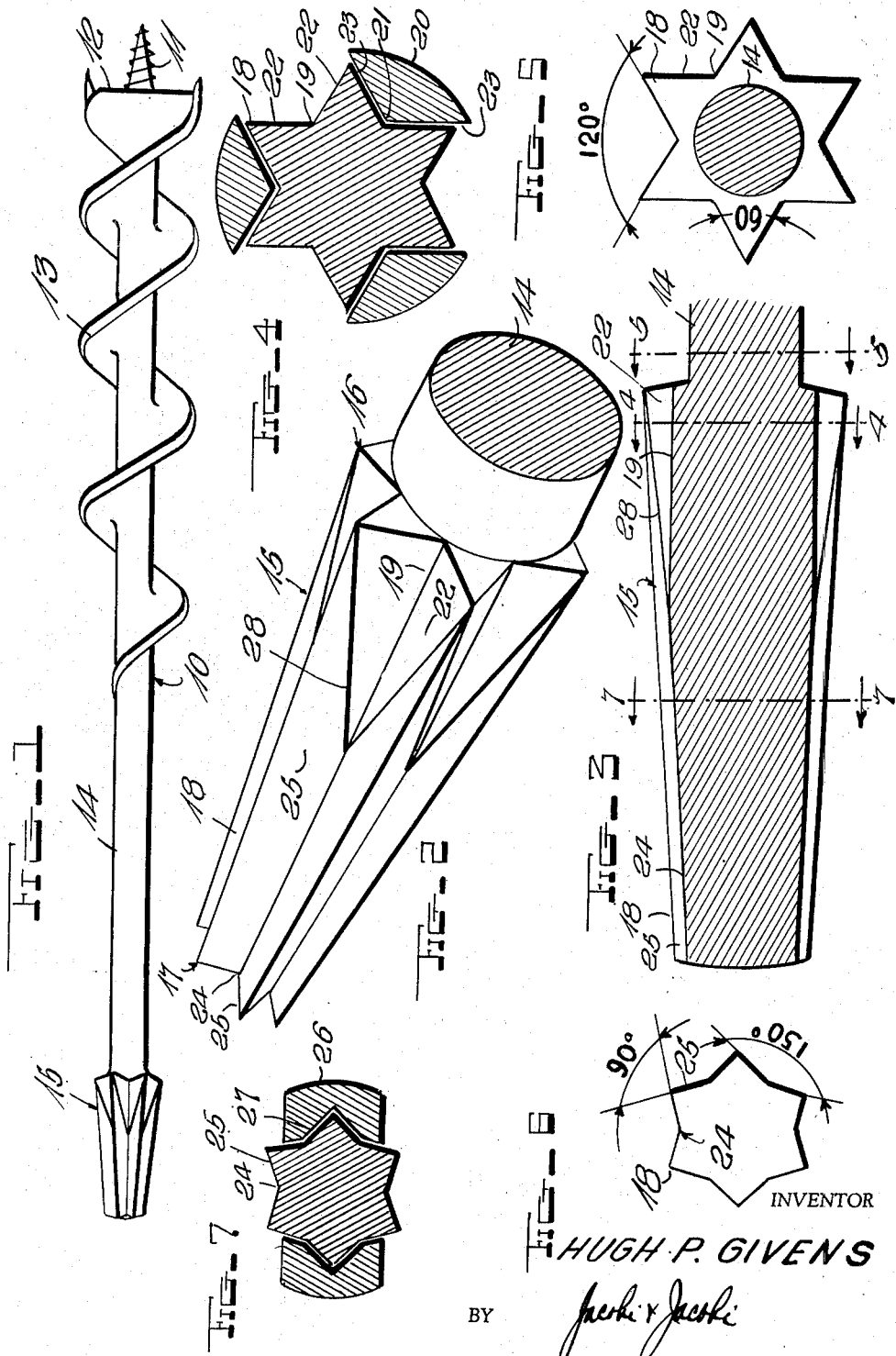

DUAL GRIP AUGER BIT SHANK

Hugh P. Givens, Newport, Va.

Application October 26, 1953, Serial No. 388,317

3 Claims. (Cl. 145—116)

This invention relates to tools and more particularly to a shank for auger bits which will permit driving engagement with the shank by two types of chucks.

Conventional hand operated bit braces are normally supplied with chucks consisting of two jaws forming a square tapered socket therebetween and including means for moving the jaws toward each other to firmly clamp and drivingly engage an auger bit. Bit braces are commonly employed only with auger bits which are provided with a tapered square shank. This has limited the use of such bits to these conventional bit braces, except when special bits are provided with straight round shanks which cannot then be used in the brace.

Electric drills and other common power driven drilling devices have commonly been supplied with a three jaw chuck in which the confronting gripping faces are parallel. These implements have normally been utilized with straight shank drill bits and were not adapted for use with auger bits having tapered square shanks.

Obviously, it would be advantageous if auger bits are designed with shanks so made that they could be interchangeably used in either a bit brace or a power driven drilling device, since in this way, the necessity for having on hand a large number of auger bits of both descriptions would be eliminated.

It is accordingly an object of this invention to provide a dual grip shank for auger bits which will permit driving engagement of such shank by either a two jaw chuck providing a square tapered socket or by a conventional three jaw chuck in which the gripping faces are parallel.

A further object of the invention is the provision of a dual grip shank for auger bits which will accommodate either a two jaw or a three jaw chuck.

A still further object of the invention is the provision of a shank for auger bits which may be held more firmly in the three jaw chuck than a round shank.

Further objects and advantagees of the invention will be apparent from the following description taken in conjunction with the accompanying drawing wherein:

Figure 1 is a side elevation view of an auger bit incorporating the dual grip shank of this invention;

Figure 2 is a fragmentary perspective view to an enlarged scale of the dual grip shank shown in Figure 1;

Figure 3 is a fragmentary, longitudinal sectional view of the dual grip shank shown in Figure 1;

Figure 4 is a sectional view on the line 4—4 of Figure 3, and showing the manner of engagement of a three jaw chuck with the dual grip shank of this invention;

Figure 5 is a sectional view on the line 5—5 of Figure 3;

Figure 6 is an end elevational view of the dual grip shank of this invention; and Figure 7 is a sectional view on the line 7—7 of Figure 3 and showing the manner of engagement of a two jaw chuck.

With continued reference to the drawing, there is shown in Figure 1 an auger bit 10 having the conventional lead screw 11, cutting edges 12 and chip removing spiral flutes 13. The auger bit 10 is also provided with an elongated substantially straight shank 14 and a dual grip chuck engaging shank 15, the specific structure of which will be presently described.

The dual grip shank 15 of this invention is provided with a portion 16 for engaging a conventional three jaw chuck and with a portion 17 for engaging a conventional two jaw chuck, which latter chuck, in effect provides a tapered socket. The portion 16 is formed by six inverted V-shaped ribs 18 in which the included angle between such ribs is 120 degrees and in which the angle between the faces of each rib is 60 degrees. It is to be noted, that the surfaces 19 between the ribs 18 are parallel to the axis of the shank.

As will be seen from an inspection of Figure 4, the portion 16 of the dual grip shank 15 may be drivingly engaged by the jaws 20 of a three jaw chuck in which the confronting chuck engaging surfaces or edges 21 are parallel to the axis of the chuck. These edges 21, engage the surfaces 19 to securely clamp the shank 15 in the chuck and the faces 22 between the ribs 18 are complementary to the tapered faces 23 of the chuck jaws 20. This results in a firm engagement between the chuck jaws 20 and the shank 15 which will securely retain the auger bit 10 in operative position and permit driving thereof by the electric drill or other power means to which the chuck jaws 20 are attached.

The dual grip shank 15 is also provided, as mentioned above, with a portion 17 to facilitate engagement of the same with the conventional two jaw chuck commonly provided in bit braces. This portion of the shank 15 is formed by continuations of the ribs 18, but the included angle between these ribs is 150 degrees, while the angle between the faces of each rib is 90 degrees. Also, in this portion of the shank, the surfaces 24 between the rib faces 25 are tapered with respect to the axis of the shank.

As will be seen from an inspection of Figure 7, the jaws 26 of a two jaw chuck of the type commonly provided in a bit brace, each have a 90 degree V-shaped recess formed by side walls 27 and it is to be noted that this recess is tapered with respect to the axis of the jaws 26. The jaws 26 engage the dual grip shank 15 of this invention with the walls 27 in engagement with the side faces 25 of the ribs 18 and, obviously, this engagement is only effective from the end of the shank 15 to the dividing line 28 between the shank portion 17 and the portion 16.

It will, therefore, be seen that the dual grip shank of this invention provides a means whereby an auger bit may be drivingly engaged by either a conventional three jaw chuck or by a conventional two jaw chuck, without in any way injuring or mutilating the engaging surfaces of the shank and also, without in any way bending or distorting the jaws of either of the chucks. Obviously, this shank greatly increases the versatility of conventional tools and provides a convenient means whereby all types of auger bits may be operated, either by a bit brace provided with a two jaw chuck, or by a power driven implement provided with a three jaw chuck.

It will be obvious to those skilled in the art that various changes may be made in the invention without departing from the spirit and scope thereof and, therefore, the invention is not limited by that which is shown in the drawing and described in the specification, but only as indicated in the appended claims.

What is claimed is:

1. In a shank for auger bits having six longitudinally extending angularly spaced symmetrical ribs of inverted V formation, all of said ribs being tapered for their entire length, the included angle between adjacent ribs being 150 degrees to provide faces having a 90 degree angle therebetween, the surfaces between said faces being tapered with respect to the axis of said shank, that improvement which comprises providing three jaw chuck engaging faces for a portion of the length of said ribs at the large end thereof, the included angle between said last named faces being 120 degrees, the surfaces between said last named faces being parallel to the axis of said shank and with the angle between the faces of that portion of each rib providing said three jaw chuck engaging faces being 60 degrees.

2. In a shank for auger bits having longitudinally extending angularly spaced symmetrical ribs, all of said ribs being tapered for their entire length, the included angle between adjacent ribs being 150 degrees to provide faces with the surfaces between said faces being tapered with respect to the axis of said shank, that improvement which comprises providing three jaw chuck engaging faces for a portion of the length of said ribs at the large end thereof, the included angle between said last named faces being 120 degrees and the surfaces between said last named faces being parallel to the axis of said shank.

3. In a shank for auger bits having longitudinally extending angularly spaced symmetrical ribs, all of said ribs being tapered for their entire length, the angle between the faces of each rib being 90 degrees and with the surfaces between such faces being tapered with respect to the axis of said shank, that improvement which comprises providing three jaw chuck engaging faces for a portion of the length of said ribs at the large end thereof, the angle between the faces of the portion of each rib providing said three jaw chuck engaging faces being 60 degrees and the surfaces between said last named faces being parallel to the axis of said shank.

References Cited in the file of this patent

UNITED STATES PATENTS

| | | |
|---|---|---|
| 1,209,362 | Turner | Dec. 19, 1916 |
| 1,746,513 | Bartels | Feb. 11, 1930 |
| 2,029,447 | Swain | Feb. 4, 1936 |
| 2,682,184 | Szarkowski | June 29, 1954 |